(12) United States Patent
Yashima et al.

(10) Patent No.: US 6,559,258 B2
(45) Date of Patent: May 6, 2003

(54) POLY (PHOSPHONOARYLACETYLENE) AND CHIRAL SENSOR COMPRISING THE SAME

(75) Inventors: Eiji Yashima, Aichi (JP); Katsuhiro Maeda, Aichi (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 10/009,514

(22) PCT Filed: Apr. 12, 2001

(86) PCT No.: PCT/JP01/03155
§ 371 (c)(1),
(2), (4) Date: Mar. 29, 2002

(87) PCT Pub. No.: WO01/79311
PCT Pub. Date: Oct. 25, 2001

(65) Prior Publication Data
US 2002/0156217 A1 Oct. 24, 2002

(30) Foreign Application Priority Data
Apr. 13, 2000 (JP) ........................................ 2000-111548

(51) Int. Cl.⁷ .............................................. C08F 138/02
(52) U.S. Cl. ........................ 526/278; 526/294; 526/277
(58) Field of Search ................................ 526/274, 277, 526/278

(56) References Cited

U.S. PATENT DOCUMENTS 4,918,212 A * 4/1990 Wuest et al. ................. 558/214
5,434,288 A * 7/1995 Lennon ....................... 558/182

FOREIGN PATENT DOCUMENTS

| JP | 56-106907 | 8/1981 |
|----|-----------|--------|
| JP | 56-167708 | 12/1981 |
| JP | 07-258344 | 10/1995 |
| JP | 09-176243 | 7/1997 |
| JP | 10-120731 | 5/1998 |

OTHER PUBLICATIONS

Eiji Yashima et al., "Chirality Assignment of Amines and Amino Alcohols based on Circular Dichroism induced by Helix Formation of a Stereoregular Poly (4–carboxyphenyl)acetylene) through Acid–Based Complexation", 119 J. Ar. Chem. Soc., (1997).

Hisanari Onouchi et al., "A helical polyelectrolyte induced by specific interactions with biomolecules in water", Am. Chem. So., vol. 123, No. 30, pp. 7441–7442, J. (Jul. 2001).

* cited by examiner

Primary Examiner—Helen L. Pezzuto
(74) Attorney, Agent, or Firm—Rader, Fishman & Grauer PLLC (57) ABSTRACT

A water-soluble polymer which has higher sensitivity and is responsive to the chirality of a wide range of optically active isomers. It is a poly(phosphonoarylacetylene) represented by the following formula (I) or a salt thereof,

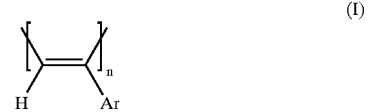

(I)

(Wherein Ar represents an aryl group substituted by a phosphono group; and n is an integer of 5 or larger). Also provided is a chiral sensor or optical resolving reagent each comprising the poly(phosphonoarylacetylene) or its salt.

8 Claims, 4 Drawing Sheets

POLY (PHOSPHONOARYLACETYLENE) AND CHIRAL SENSOR COMPRISING THE SAME

TECHNICAL FIELD

The present invention relates to novel poly (phosphonoaryl acetylene) having an aryl group substituted with a phosphono group or a salt thereof, a chiral sensor using the same and an optical resolution using the same. The Poly (phosphonoaryl acetylene) or the salt thereof of the invention is stereoregular, exhibits circular dichroism in the presence of an optically active substance, is an excellent material in water solubility and is useful as the chiral sensor and optical resolving reagent.

BACKGROUND OF THE INVENTION

As substances having optical asymmetry, a number of substances have been known such as those having asymmetric carbons and molecular asymmetry. These substances have been widely used in the industry as functional materials such as optical resolving reagents, liquid crystal materials, chiral sensors, non-linear optical materials and the like.

Among these asymmetric molecules, polymer substances having molecular asymmetry have been recently noticed, and for example, poly (triphenyl methyl methacrylate) (Japanese Patent Laid-Open No. 106907/1981) having a helix structure and high optical rotation, optically active polyacrylate amide derivatives (Japanese Patent Laid-Open No. 167708/1981) and the like have been known.

Also the present inventors previously-have found that the polymer of (4-carboxyphenyl) acetylene exhibits the splitting type of induced circular dichroism (ICD) against optically active amine and amino alcohol in an organic solvent such as dimethylsulfoxide (DMSO) (Japanese Patent Laid-open No. 176243/1997). These substances were useful as chiral sensors and optical resolving reagents with this unique nature. However, a large amount of optically active substance is required for manifestation of ICD in the organic solvent and types of amino acids which manifest ICD in water are limited. Thus, development of water soluble polymers has been desired, which more supersensitively respond to chirality of more broad range of optically active substances.

DISCLOSURE OF THE INVENTION

The present invention provides a water soluble polymer which more supersensitively responds to chirality of more broad range of optically active substances.

BRIEF DESCRIPTION OF THE DRAWINGS

In FIG. 3, (a) is the CD spectra of Polymer-1-(S)-1-(1-naphthyl) ethylamine, (b) is the CD spectra of Polymer-1-(R)-1-(1-naphthyl) ethylamine, and (c) is the absorption spectra of Polymer-1-(R)-1-(1-naphthyl) ethylamine.

In FIG. 4, (a) is the CD spectra of Polymer-1-(S)-phenyl alaninol, and (b) is the absorption spectra of Polymer-1-(S)-phenyl alaninol.

In FIG. 5, (a), (b) and (c) are the CD spectra of Polymer-1-(S)-leucine at 25° C., 0° C. and −10° C., respectively, and (d) is the absorption spectra of Polymer-1-(S)-7 at 25° C.

BEST MODE FOR CARRYING OUT THE INVENTION

As the results of the intensive study to solve the above problems, the present inventors have found poly (phosphonoaryl acetylene), a polymer having a phosphono group in its side chain, manifests ICD supersensitively in either an organic solvent or water. In particular in water, it responded to all amino acids up to 20 types, and further highly selectively responded to amino sugars including streptomycin which is an antibiotic and manifested ICD.

That is, the present invention relates to poly (phosphonoaryl acetylene) represented by the following formula (I) or a salt thereof:

(I)

wherein Ar represents an aryl group substituted with a phosphono group and n represents an integer of 5 or more.

The invention also relates to a chiral sensor or optical resolving reagent containing the poly (phosphonoaryl acetylene) or the salt thereof.

There have been few examples where chirality of amino alcohol including amino acids and amino sugars was detected supersensitively in water, although development of asymmetry identification in water has been intensively studied in and out of the country. The present inventors previously developed poly (carboxyaryl acetylene) having a carboxyl group on its side chain (Japanese Patent Laid-Open No. 176243/1997), which did not necessarily have sufficient performances in sensitivity and water solubility.

A novel chirality identification material of which sensitivity and water solubility were greatly improved could be created by using a phosphono derivative which is more strongly acidic, instead of the carboxyl group on the side chain.

For example, poly(4-phosphonophenyl acetylene) (hereinafter referred to as Polymer-1) represented by the following formula (II) is described as an example.

(II)

Polymer-1 is a yellow solid, absorbs light in the ultra violet to visible light region, and exhibited a peak of the splitting type of induced circular dichroism (ICD) in this area in DMSO in the presence of an optically active amine or amino alcohol.

For example, it exhibited a peak of the splitting type of induced circular dichroism (ICD) in the presence of (R)- or (S)-1-(1-naphthyl) ethylamine (Compound [2]).

Figure 3:
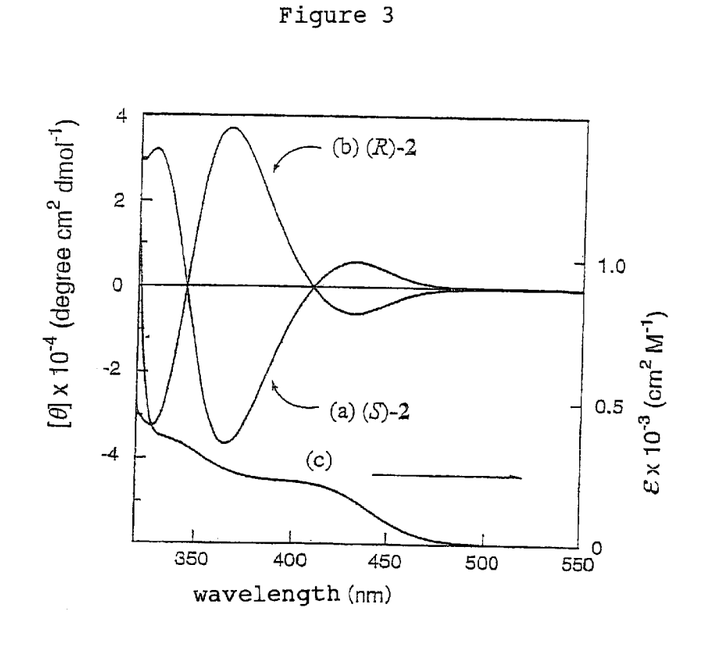
FIG. 3 shows absorption spectra and CD spectra in DMSO at room temperature (25° C.) of poly(4-phosphonophenyl acetylene) of the invention (Polymer-1) in the presence of (R)- or (S)-1-(1-naphthyl) ethylamine.

FIG. 3 shows the absorption spectra and CD spectra of Polymer-1 in DMSO at room temperature (25° C.) in the presence of (R)- or (S)-1-(1-naphthyl) ethylamine. In FIG. 3, (a) is the CD spectra of Polymer-1-(S)-1-(1-naphthyl) ethylamine, (b) is the CD spectra of Polymer-1-(R)-1-(1-naphthyl) ethylamine, and (c) is the absorption spectra of Polymer-1-(R)-1-(1-naphthyl) ethylamine.

This result appears to indicate that the optically active amine or amino alcohol interacts with the phosphono group of Polymer-1 thereby forming a helix structure where a backbone twists in one direction for either right or left to manifest ICD.

Additionally, Polymer-1 also exhibited ICD in the presence of the optically active amine or amino alcohol of Compounds 2 to 10 represented by the following formulae, however, the splitting patterns of ICD varied depending on the absolute configuration of the optically active substance used, indicating that the same sign of ICD tends to be exhibited if the absolute configuration is identical.

When this nature is utilized, ICD of Polmer-1 can be utilized as a means to predict the absolute configuration of various amines.

It was also found that intensity of ICD was saturated by almost equivalent quantity of amine when intensity of ICD was measured with various quantities of amine. Given that 10 folds or more quantity of amine was required for saturation of ICD intensity in the case of (4-carboxyphenyl) acetylene polymer synthesized previously, Polymer-1 of the invention is considered to be extremely supersensitive.

The results of ICD of Polymer-1 in DMSO in the presence of the optically active amine and amino alcohol of the compounds from 2 to 10 are together shown in Table 1.

TABLE 1

Signs of the splitting type of Cotton effect and molar ellipticity[θ] of Polymer-1 and amine complex

| Amine | 1st Cotton Sign $[\theta] \times 10^{-3}(\lambda)$ | 2nd Cotton Sign $[\theta] \times 10^{-4}(\lambda)$ | 3rd Cotton Sign $[\theta] \times 10^{-4}(\lambda)$ |
|---|---|---|---|
| (R)-2 | −6.72(430.0) | +3.71(365.0) | −3.25(328.0) |
| (S)-2 | +6.01(430.0) | −3.64(365.0) | +3.21(328.0) |
| (R)-3 | −5.25(431.0) | +3.15(365.0) | −2.83(327.0) |
| (R)-4 | −2.06(429.0) | +1.39(365.0) | −1.31(328.0) |
| (S)-5 | +4.74(430.0) | −2.47(365.0) | +2.32(329.0) |
| (S)-6 | +1.89(430.0) | −1.02(366.0) | +0.99(328.0) |
| (S)-7 | +4.89(434.0) | −2.74(366.0) | +2.65(328.0) |
| (R)-8 | −4.64(431.0) | +2.81(366.0) | +2.68(328.0) |
| (1R,2S)-9 | −6.31(432.0) | +3.66(366.0) | −3.36(329.0) |
| (1S,2R)-10 | +7.14(430.0) | −3.93(366.0) | +3.72(328.0) |

The condition for measurement of ICD in Table 1 is as follows:

Measurement condition (Table 1)

Polymer-1: 1.0 mg/mL, 5.6 mmol monomer unit/mL

Chiral amine/Polymer-1 (molar ratio): 50

Solvent: DMSO

Length of cell: 0.05 cm
Temperature: room temperature (25° C.)
[θ]: degree cm$^2$ dmol$^{-1}$
λ: nm

Polmer-1 is water soluble, and exhibited the splitting type of ICD at conjugated double bond absorption of the polymer backbone in water as well as in DMSO in the presence of the optically active amine or amino alcohol, or further amino acid.

For example, Polymer-1 of the invention exhibited the splitting type of ICD in measurement in water with the optically active (S)-phenyl alaninol (Compound (S)-7) or (S)-leucine (L-leucine).

Figure 4:
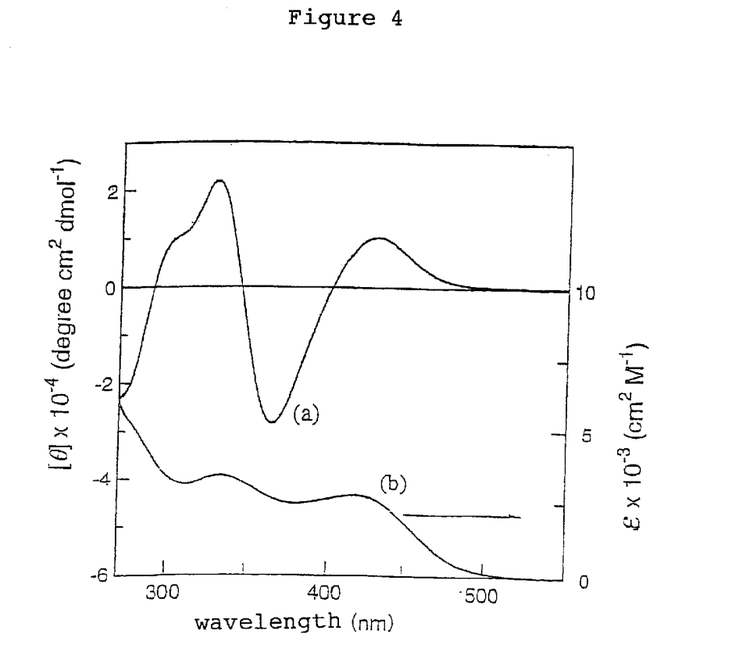
FIG. 4 shows the CD and absorption spectra in water at room temperature (25° C.) of poly(4-phosphonophenyl acetylene) of the invention (Polymer-1) in the presence of (S)-phenyl alaninol (7).

FIG. 4 shows the CD and absorption spectra in water at room temperature (25° C.) in the presence of (S)-phenyl alaninol(7). In FIG. 4, (*a*) is the CD spectra of Polymer-1-(S)-phenyl alaninol, and (*b*) is the absorption spectra of Polymer-1-(S)-phenyl alaninol.

Figure 5:
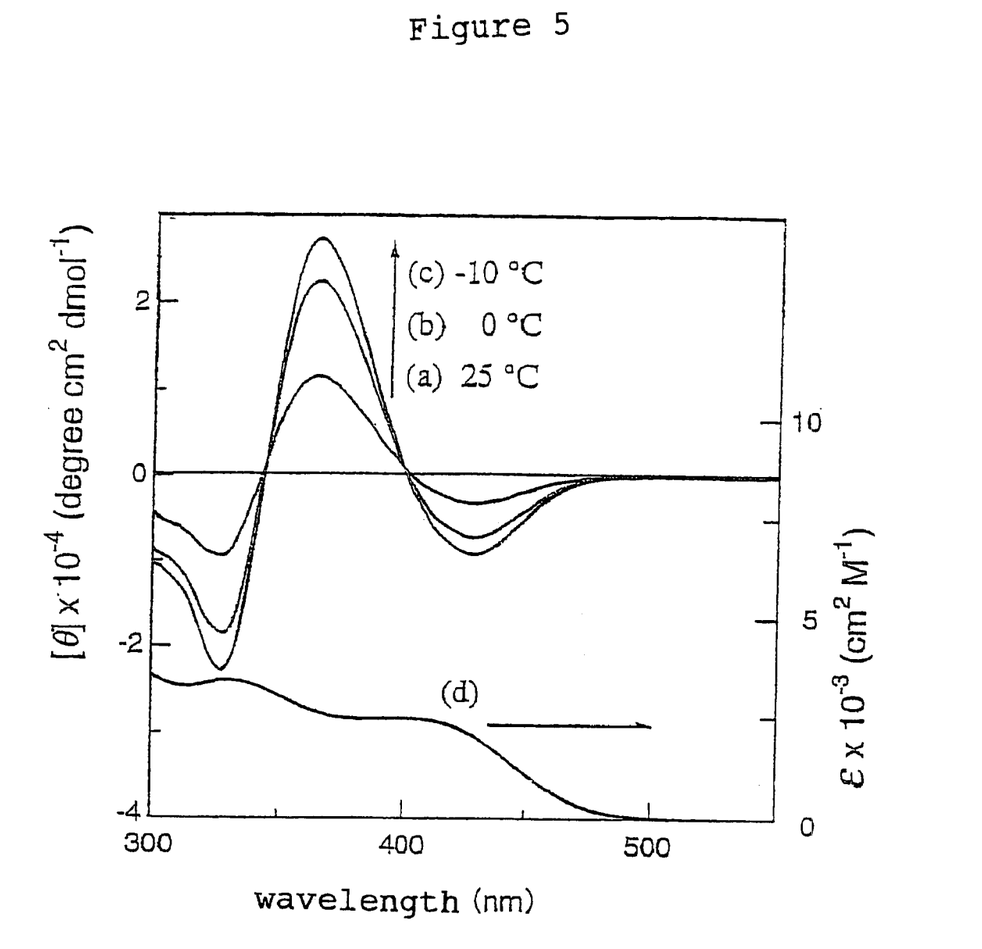
FIG. 5 shows the absorption spectra and CD spectra in water at −10° C., 0° C. and 25° C. of poly(4-phosphonophenyl acetylene) of the invention (Polymer-1) in the presence of (S)-leucine.

FIG. 5 shows the absorption spectra and the CD spectra in water at −10° C., 0° C. and 25° C. of Polymer-1 in the presence of (S)-leucine. In FIG. 5, (*a*), (*b*) and (*c*) are the CD spectra of Polymer-1-(S)-leucine at 25° C., 0° C and −10° C., respectively, and (*d*) is the absorption spectra of Polymer-1-(S)-7 at 25° C.

Additionally, Polymer-1 also exhibited ICD in the presence of the optically active amine or amino alcohol of Compounds from 5 to 9 and Compound 11 represented by the following formulae.

Also Polymer-1 was found to exhibit ICD even in the presence of quite a number of types of amino acids. It was found that the splitting patterns of ICD varied depending on the absolute configuration of the optically active substance used and that the same sign of ICD tended to be shown if the absolute configuration was identical. The ICD of Polymer-1 can be utilized as the means to predict the absolute configuration of various amines and amino acids in water when this nature is utilized.

The results of Polyme-1 ICD in water in the presence of various amine or amino alcohol are together shown in the following Table 2, together with the results of Polymer-1 ICD in water in the presence of amino acid are shown in Table 3.

TABLE 2

Signs of the splitting type of Cotton effect and molar ellipticity[θ] of Polymer-1 and amine complex in water

| Amine | 1st Cotton Sign [θ] × 10$^{-3}$(λ) | 2nd Cotton Sign [θ] × 10$^{-3}$(λ) | 3rd Cotton Sign [θ] × 10$^{-3}$(λ) |
|---|---|---|---|
| (S)-5 | −0.73(428.0) | +2.01(364.0) | −1.56(327.0) |
| (S)-6 | — | +0.65(365.0) | −0.48(327.0) |
| (S)-7 | +10.2(430.0) | −28.4(364.0) | −21.8(328.0) |
| (R)-8 | +1.14(431.0) | −2.91(367.0) | +2.61(329.0) |
| (1R,2S)-9 | +12.5(427.0) | −34.4(363.0) | +25.6(328.0) |
| (S)-10 | −0.67(430.0) | +1.83(363.0) | −1.33(327.0) |

TABLE 3

Signs of the splitting type of Cotton effect and molar ellipticity[θ] of Polymer-1 and amino acid complex in water

| | | 2nd Cotton | | |
|---|---|---|---|---|
| No. | Amino acid | 25° C. Sign [θ] × 10$^{-4}$(λ) | 0° C. Sign [θ] × 10$^{-4}$(λ) | −10° C. Sign [θ] × 10$^{-4}$(λ) |
| 1. | L-alanine | +0.58(365) | +2.63(369) | — |
| 2. | L-valine | +0.24(361) | +1.18(365) | +1.81(365) |
| 3. | L-leucine | +1.07(364) | +2.20(365) | +2.70(365) |
| 4. | L-isoleucine | +1.09(364) | +2.37(364) | +2.89(364) |
| 5. | L-proline | −1.31(365) | −2.34(365) | −2.65(365) |
| 6. | L-methionine | +0.72(366) | +1.58(366) | +1.99(366) |
| 7. | L-phenyl alanine | +0.27(368) | +1.33(365) | — |
| 8. | L-serine | +0.62(363) | +1.98(365) | — |
| 9. | L-threonine | +0.66(365) | +1.81(365) | +2.39(365) |
| 10$^a$. | L-tyrosine | +0.05(367) | +0.36(367) | +0.60(365) |
| 11$^b$. | L-aspartic acid | +0.45(364) | +2.45(366) | — |
| 12$^b$. | L-glutamic acid | +0.08(360) | +1.10(365) | +2.08(366) |
| 13$^b$. | L-histidine hydrochloride | −0.99(364) | −3.69(364) | −4.10(365) |
| 14$^b$. | L-tryptophan | +3.65(362) | +4.37(364) | — |
| 15. | L-cysteine | +1.32(365) | +3.05(365) | +3.49(365) |
| 16. | L-asparagine | — | +0.39(363) | +0.76(364) |
| 17. | L-glutamine | −0.29(363) | +0.60(365) | — |
| 18. | L-lysine hydrochloride | −0.98(365) | +0.49(358) | +2.07(363) |
| 19. | L-arginine hydrochloride | −2.15(365) | −1.60(365) | +0.93(362) |

The condition for measurement of ICD in Table 2 is as follows:

Measurement condition (Table 2)
Polymer-1: 1.0 mg/mL, 5.6 mmol monomer unit/mL
Chiral amine/Polymer-1 (molar ratio): 10
Solvent: water
Length of cell: 0.05 cm
Temperature: room temperature (25° C.)
[θ]: degree cm$^2$ dmol$^{-1}$
λ: nm The condition for measurement of ICD in Table 3 is as follows. In the table, a represents that amino acid/Polymer-1 ratio (molar ratio) is 2 and b denotes it is 5.

Measurement condition (Table 3)

Polymer-1: 1.0 mg/mL, 5.6 mmol monomer unit/mL

Amino acid/Polymer-1 (molar ratio): 10

Solvent: water

Length of cell: 0.1 cm

Temperature: −10° C., 0° C. and 25° C. (temperature control was done using Peltier type incubator supplied by JASCO Corporation.)

[θ]: degree cm$^2$ dmol$^{-1}$

λ: nm

It was found that Polymer-1 exhibits ICD in this area in water in the presence of various optically active amino sugars including antibiotics of Compounds from 12 to 18 represented by the following formulae.

Streptomycin

Paromomycin

Bekanamycin

The results showed that the polymer of the invention can be used to indentify assymmetry of a variety of natural products.

The results of ICD of Polymer-1 in water in the presence of various optically active amino sugars are together shown in Table 4.

TABLE 4

Signs of the splitting type of Cotton effect and molar ellipticity[θ] of Polymer-1 and amino sugar complex in water

| Amino sugar | 1st Cotton Sign [θ] × 10$^{-3}$(λ) | 2nd Cotton Sign [θ] × 10$^{-4}$(λ) | 3rd Cotton Sign [θ] × 10$^{-4}$(λ) |
|---|---|---|---|
| 12 | −0.24(423.5) | +4.64(363.0) | +3.66(327.0) |
| 13 | −10.8(427.5) | +28.6(364.0) | −22.8(327.5) |
| 14 | −0.27(432.5) | +0.89(365.5) | −0.55(328.0) |
| 15 | +12.8(426.0) | −35.7(363.5) | +30.4(327.5) |
| 16 | −14.1(428.5) | +36.1(365.0) | −29.1(328.5) |
| 17 | +1.15(427.0) | −2.62(366.0) | +2.12(329.0) |
| 18 | +7.66(426.0) | −20.4(365.5) | +16.6(327.5) |

The condition for measurement of ICD in Table 4 is as follows. The solubility of amino sugar hydrochloride is used by dissolving in an alkali solution containing NaOH of which quantity is approximately 0.5 equivalence for the quantity of corresponding hydrochloric acid.

Measurement condition (Table 4)

Polymer-1: 1.0 mg/mL, 5.6 mmol monomer unit/mL

Amino sugar/Polymer-1 (molar ratio): 5

Solvent: water

Length of cell: 0.05 cm

Temperature: room temperature (25° C.)

[θ]: degree cm$^2$ dmol$^{-1}$

λ: nm

Aryl groups in poly(phosphonoaryl acetylene) represented by the formula (I) of the invention include monocyclic, condense cyclic or polycyclic carbocyclic aromatic groups having from 6 to 30, preferably from 6 to 15 of carbon atoms such as a phenyl group, a naphthyl group, a phenanthryl group and the like, and 5- to 8-membered monocyclic, condense cyclic or polycyclic hetero aryl groups containing 1 to 3 of nitrogen, oxygen or sulfur atoms as heteroatoms such as a pyridyl group, a quinolyl group and the like. Poly(phosphonoaryl acetylene) of the invention is characterized in that such aryl group is substituted with a phosphono group [—P(O)(OH)$_2$]. A position substituted with a phosphono group is not particularly limited so long as it is a position capable of being substituted, but a para-position is preferable because of its easiness of synthesis.

These aryl groups may have additional substituents in addition to the phosphono group, and such substituents include an alkyl group, an alkoxy group, an ester group and the like. However, to retain hydrophilicity of the polymer of the invention, it is not preferable that a hydrophobic substituent which may prevent hydrophilicity of the polymer of the invention is introduced.

The polymer of the invention can be produced by polymerizing an ester or salt of its monomer, phosphonoaryl acetylene in the presence of an catalyst consisting of transition metal compounds such as Rh, Ru, W, Mo and the like, preferably a complex of these transition metals, followed by hydrolyzing an ester body as needed. A preferable catalyst for polymerization includes [RhCl (norbornadien)]$_2$.

As solvents for polymerization reaction, ether solvents such as tetrahydrofuran (THF), dioxane and the like, carbohydrate solvents such as benzene, toluene and the like, non-proton polar solvents such as dimethylsulfoxide (DMSO), dimethylformamide (DMF) and the like, and water can be used. The condition of reaction such as temperatures and time periods for polymerization can be appropriately fixed, for example from low to boiling temperature of the solvents as the polymerization temperature. The following examples can be referred for details.

The polymerization degree of the polymer of the invention is 5 or more, preferably 50 or more, more preferably 100 or more and still more preferably 500 or more.

The salts of the polymer of the invention include metallic salts such as sodium salt, potassium salt, and the like and organic ammonium salt.

The monomers which produce the polymer of the invention can be produced by the established methods. For example, the monomer can be produced by the method in which the substituent of substituted aryl acetylene compound is substituted with a phosphono group. The following examples can be referred for details.

The poly(phosphonoaryl acetylene) of the invention has preferably the helix structure of cis-transoid but is not limited thereto.

The invention relates to a process for producing a novel polyacetylene derivative and a unique chiral recognition ability, and the derivative of the invention has the unique nature wherein circular dichroism in a long wavelength area is exhibited in water in the presence of the optically active amine, amino alcohol, amino acid, or amino sugar, and is utilized for chiral sensors, optical resolutions, liquid crystal, non-linear optical materials and the like as a functional material.

Further application of the invention provides practical supersensitive sensors of amino acids and amino sugars.

(F) EXAMPLES

The invention is specifically described by the following examples, but the invention is not limited to these examples.

Example 1

Synthesis of poly((4-phosphonophenyl) Acetylene) (Polymer-1)

A synthetic scheme of this polymer is shown below.

polyDEPA

Polymer-1

1. Synthesis of (4-diethyl Phosphonophenyl) Acetylene (DEPA)

Under a nitrogen atmosphere, 20 g (71 mmol) of 4-bromoiodo benzene was reacted with 10 ml (73 mmol) of trimethyl silyl acetylene in dry triethylamine (235 ml) at room temperature for 20 hours in the presence of 300 mg (1.1 mmol) of triphenyl phosphine, 330 mg (1.7 mmol) of copper iodide and 200 mg (0.28 mmol) of triphenyl phosphine palladium chloride. An insoluble portion was removed by filtration and the solvent was distilled off to yield the crude product quantitatively. 17.7 g (73 mmol) of this was dissolved in a mixed solvent of dry toluene (368 mL) and triethylamine (11 mL) and then reacted with 10.3 mL (74.5 mmol) of diethyl phosphite under a nitrogen atmosphere in the presence of 92 g (0.35 mol) of triphenyl phosphine and 4.1 g (3.1 mmol) of tetrakistriphenyl phosphine palladium.

Figure 1:
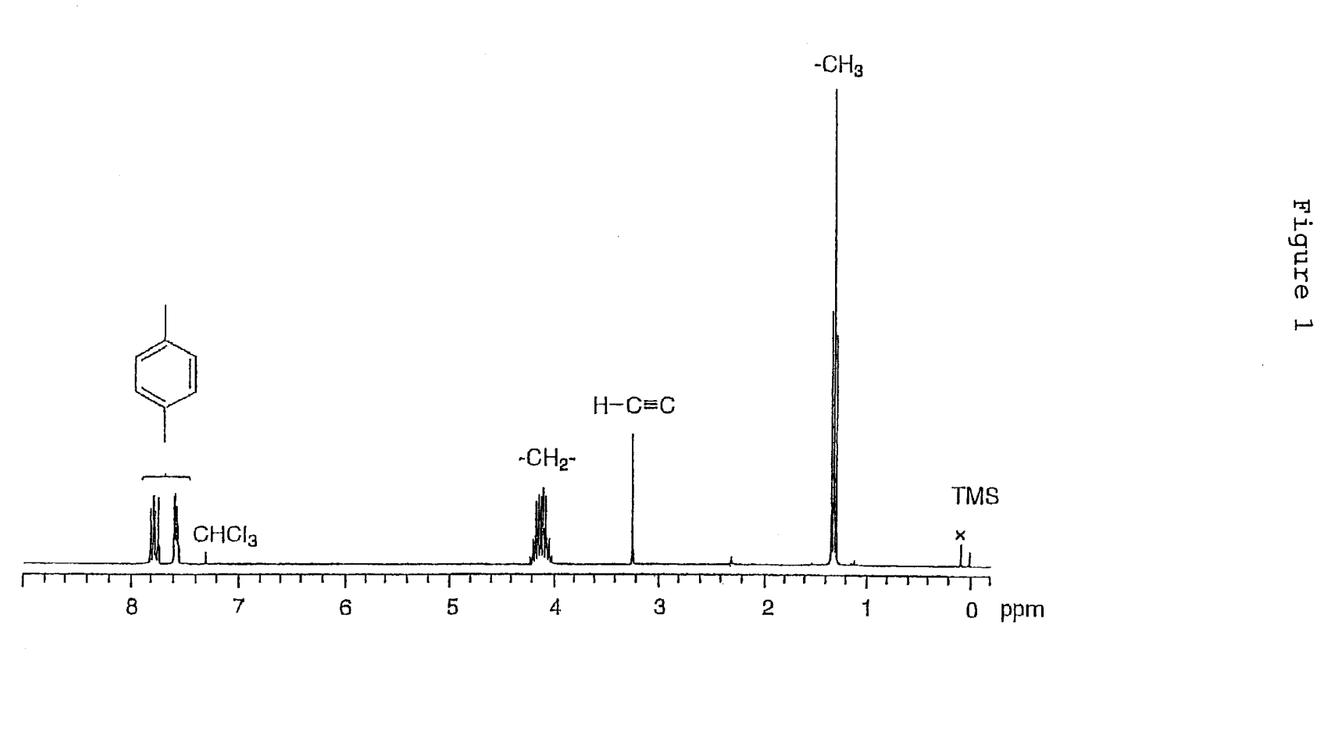
FIG. 1 shows a chart of $^1$H NMR spectra in CDCl$_3$ at 25° C. of (4-diethyl phosphonophenyl) acetylene which is a monomer of the invention.

After refluxing at 110° C. for 6 hours, the product was removed and the solvent was distilled off. The product was purified by a column chromatography on silica gel (eluent; ethyl acetate: hexane=1:5) to afford a corresponding trimethyl silyl acetylene derivative. It was further mixed with 1N of tetrabutyl ammonium fluoride in THF solution (140 ml) in dry tetrahydrofuran (THF) (70 mL), stirred at room temperature for 3 hours, and the trimethyl silyl group was removed to afford a target, (4-diethyl phosphonophenyl) acetylene (hereinafter abbreviated as DEPA). Purification was performed by distillation under reduced pressure to yield 7.2 g of colorless liquid (yield: 71%) (boiling point [b.p.]=116 to 122° C./0.7 mmHg). $^1$H NMR spectra of DEPA is shown in FIG. 1.

2. Polymerization Reaction

Polymerization was conducted under a nitrogen atmosphere using dry THF as a solvent. DEPA (3.1 g, 13.1 mmol) was polymerized at 30° C. for 16 hours in the presence of dry triethylamine (3.6 mL) using [Rh (nbd) Cl]$_2$ (nbd=norbornadien) (30.2 mg, 0.13 mmol) as a catalyst. The concentration of monomer is 0.5 M, and the molar ratio of the monomer to the catalyst [DEPA ]/[Rh] is 100. The reaction solution was poured into a large excess amount of diethyl ether to afford yellow-orange fibrous polymer (hereinafter abbreviated as poly DEPA) with a yield of 86% (2.7 g). The number average molecular weight (Mn=1.28× 10$^5$) and the molecular weight distribution (Mw/Mn=7.0) were obtained by a size exclusion chromatography (SEC) (eluent: THF-0.1% tetrabutyl ammonium bromide) using polystyrene as a standard sample. The resulting poly DEPA was stirred in 5N of sodium methoxide in methanol solution at room temperature for 55 hours, and then was neutralized with HCl followed by distilling off methanol. The residue was dissolved in water. The precipitate generated by acidifying again with HCl was collected by a centrifuge. Once washed with water, it was dissolved in a small amount of water and freeze-dried to afford poly(4-phosphonophenyl acetylene) (here in after abbreviated as Polymer-1) quantitatively. The cleavage ratio of the ester group was approximately 98%, which was obtained from $^1$H NMR spectra. It appear that stereoregularity of the produced polymer is approximately 100% cis-transoid from the data of $^1$H NMR spectra of Polymer-1.

Figure 2:
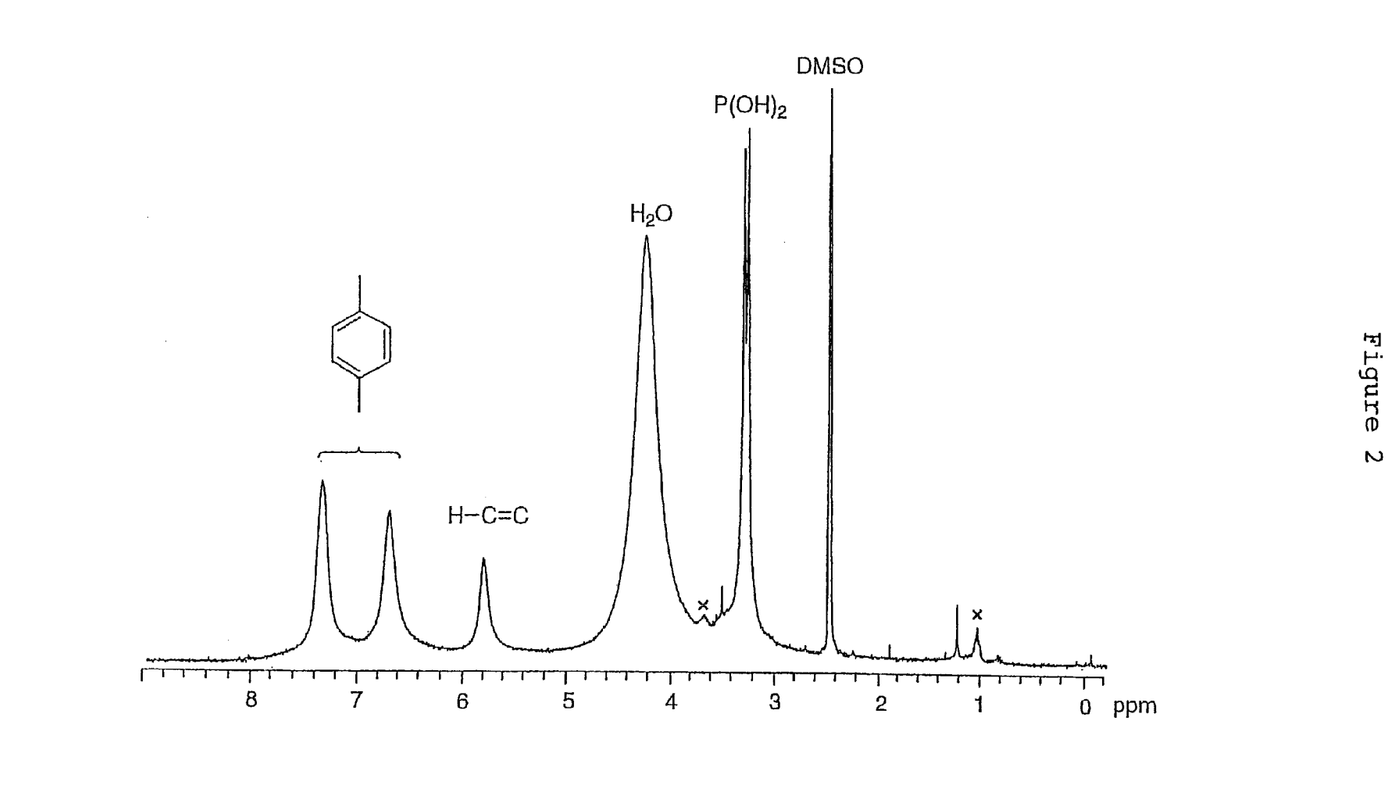
FIG. 2 shows a chart of the $^1$H NMR spectra in DMSO-d$_6$ at 60° C. of poly(4-phosphonophenyl acetylene) of the invention.

$^1$H NMR spectra of Polymer-1 in DMSO-d$_6$ at 60° C. is shown in FIG. 2.

Example 2

Chiral Recognition Ability Based on Helix Induction

The absorption spectra and CD spectra were measured in the presence of Polymer-1 obtained from Example 1 and (R)- or (S)-1-(1-naphthyl) ethylamine (2) under the following condition.

Measurement condition (FIG. 3)

Polymer-1: 1.0 mg/mL, 5.6 mmol monomer unit/mL (R)- or (S)-1-(1-naphthyl) ethylamine (2) (280 mmol) ([1-(1-naphthyl) ethylamine]/[Polymer-1 ]=50 mol/mol)

Solvent: DMSO

Cell length: 0.05 cm

Measurement temperature: room temperature (25° C.)

Absorption spectra: JASCO Corporation, JASCO V-570

CD spectra: JASCO Corporation, JASCO J-725L

The results of the measurement are shown in FIG. 3. In FIG. 3, (a) is the CD spectra of Polymer-1-(S)-(2,), (b) is the CD spectra of Polymer-1-(R)-(2), and (c) is the absorption spectra of Polymer-1-(R)-(2).

Example 3

Measurement of the Splitting Type of Cotton Effect

The sign of Cotton effect and molar ellipticity [θ] for each compound were measured in DMSO (Table 1) or in water (Tables 2 to 4) in the presence of Polymer-1 under the measurement condition as shown in each Table.

The results are shown in Tables 1 to 4.

Example 4

Chiral Recognition Ability Based on Helix Induction in Water.

The absorption spectra and CD spectra in water were measured under the following condition for Polymer-1 obtained from Example 1 with optically active (S)-phenyl alaninol (Compound (S)-7) (FIG. 4) or (S)-leucine (L-leucine) (FIG. 5).

Measurement condition for (S)-phenyl alaninol (Compound(S)-7) (FIG. 4)

Polymer-1: 1.0 mg/mL, 5.6 mmol monomer unit/mL

L-phenyl alaninol 56 mmol ([phenyl alaninol]/[Polymer-1]=10 mol/mol)

Solvent: water

Cell length: 0.05 cm

Measurement temperature: room temperature (25° C.)

Absorption spectra: JASCO Corporation, JASCO V-570

CD spectra: JASCO Corporation, JASCO J-725L

Measurement condition for (S)-leucine (L-leucine) (FIG. 5)

Polymer-1: 1.0 mg/mL, 5.6 mmol monomer unit/mL

L-leucine 56 mmol ([leucine]/[Polymer-1]=10 mol/mol)

Solvent: water

Cell length: 0.1 cm

Measurement temperature: −10° C., 0° C. and 25° C. (temperature control was done using Peltier type incubator supplied by JASCO Corporation.)

Absorption spectra: JASCO Corporation, JASCO V-570

CD spectra: JASCO Corporation, JASCO J-725L

The results are shown in FIGS. 4 and 5.

In FIG. 4, (a) is the CD spectra of Polymer-1-(S)-(7) and (b) is the absorption spectra of Polymer-1-(S)-(7). In FIG. 5, (a), (b) and (c) are the CD spectra of Polymer-1-(S)-(7) at 25° C., 0° C. and −10° C., respectively, and (d) is the absorption spectra of Polymer-1-(S)-(7) at 25° C.

INDUSTRIAL APPLICABILITY

The invention provides a novel polyaryl acetylene derivative. The polyaryl acetylene derivative of the invention has a unique chiral recognition ability and a characteristic nature that it exhibits circular dichroism at a long wavelength area in water in the presence of an optically active amine, amino alcohol, amino acids and amino sugar, and can be utilized for chiral sensors, optical resolving reagent, liquid crystal, non-linear optical materials and the like as a supersensitive functional material. The polyaryl acetylene derivative of the invention can be also used in water since it is excellent in water solubility.

What is claimed is:

1. Poly(phosphonoaryl acetylene) represented by the following formula (I), or a salt thereof:

(I)

wherein Ar represents an aryl group substituted with a phosphono group and n represents a number of 5 or more.

2. Poly(phosphonoaryl acetylene) or the salt thereof according to claim 1, wherein the aryl group is a carbocyclic aryl group.

3. Poly(phosphonoaryl acetylene) or the salt thereof according to claim 2, wherein the aryl group is a phenyl group.

4. Poly (phosphonoary acetylene) or the salt thereof according to claim 1, wherein the aryl group substituted with a phosphono group is 4-phosphonopheny group.

5. A chiral sensor containing poly (phosphonoaryl acetylene) or the salt thereof according to claim 1.

6. The chiral sensor according to claim 5, wherein poly (phosphonoaryl acetylene) or the salt thereof is poly (4-phosphonophenyl acetylene) or the salt thereof.

7. An optical resolving reagent containing poly (phosphonoaryl acetylene) or the salt thereof according to claim 1.

8. The optical resolving agent according to claim 7, wherein poly(phosphonoaryl acetylene) or the salt thereof is poly (4-phosphonophenyl acetylene) or the salt thereof.

* * * * *